United States Patent [19]

Wamprecht et al.

[11] Patent Number: 5,135,987

[45] Date of Patent: Aug. 4, 1992

[54] MODIFIED COPOLYMERS, A PROCESS FOR THEIR PRODUCTION, BINDERS CONTAINING THE MODIFIED COPOLYMERS AND THEIR USE IN COATING COMPOSITIONS AND SEALING COMPOUNDS

[75] Inventors: Christian Wamprecht, Neuss; Harald Blum, Wachtendonk; Josef Pedain, Cologne; Peter Höhlein, Kempen, all of Fed. Rep. of Germany

[73] Assignee: Bayer Aktiengesellschaft, Leverkusen, Fed. Rep. of Germany

[21] Appl. No.: 648,537

[22] Filed: Feb. 22, 1991

Related U.S. Application Data

[62] Division of Ser. No. 368,186, Jun. 19, 1989, abandoned.

[30] Foreign Application Priority Data

Jul. 3, 1988 [DE] Fed. Rep. of Germany ....... 3822498

[51] Int. Cl.⁵ .................. C08L 33/10; C08L 35/02; C08F 265/04; C08F 267/04
[52] U.S. Cl. ................................. 525/285; 525/276; 525/292; 525/296; 525/308; 525/327.6; 525/330.5; 525/375; 525/379; 525/380; 525/381; 525/382; 525/384; 525/385
[58] Field of Search ............... 525/276, 285, 292, 296, 525/308, 327.6, 330.5, 375, 379, 380, 381, 382, 384, 385

[56] References Cited

U.S. PATENT DOCUMENTS

4,062,908 12/1977 van Acker.
4,279,793 7/1981 Wellner.

FOREIGN PATENT DOCUMENTS

0150212 8/1981 German Democratic Rep..
59-078207 5/1984 Japan.

OTHER PUBLICATIONS

Translation of East German Patent 0150212.
Translation of Japan Patent 59-078207.

*Primary Examiner*—Ana L. Carrillo
*Assistant Examiner*—Vasu S. Jagannathan
*Attorney, Agent, or Firm*—Connolly and Hutz

[57] ABSTRACT

Binders for moisture-hardening coating or sealing compositions contain modified copolymers having a weight average molecular weight of from 1,500 to 75,000 determined by gel permeation chromatography of olefinically unsaturated compounds containing chemically incorporated moieties which are addition-reactive to amino wherein the modified copolymers contain both
(i) intramolecular carboxylic anhydride moieties and
(ii) olefinically unsaturated (meth)acrylate moieties in chemically bound form as the moieties which are addition-reactive to amino, with the anhydride equivalent weight being in the range from 392 to 9,800 and the (meth)acrylate equivalent weight in the range from 284 to 7,100.

4 Claims, No Drawings

MODIFIED COPOLYMERS, A PROCESS FOR THEIR PRODUCTION, BINDERS CONTAINING THE MODIFIED COPOLYMERS AND THEIR USE IN COATING COMPOSITIONS AND SEALING COMPOUNDS

This application is a divisional of Ser. No. 368,186 filed on Jun. 19, 1989, now abandoned.

This invention relates to new modified copolymers which contain chemically incorporated, olefinically unsaturated (meth)acrylate groups in addition to chemically incorporated, intramolecular acid anhydride groups, to a process for the production of these modified copolymers, to binders containing the modified copolymers and organic polyamines containing blocked amino groups and to their use in moisture-hardening coating compositions and sealing compounds.

BACKGROUND OF THE INVENTION

The use of combinations of organic compounds containing at least two intramolecular carboxylic anhydride groups per molecule, particularly copolymers containing succinic anhydride, and polyhydroxyl compounds as binders for paints and coating compositions is already known from EP-A-48 128.

However, the notion of applying the principle of this publication to the reaction of amines with anhydrides is complicated by the fact that the reaction of amines with anhydrides is a very fast reaction, even at room temperature, which leads to crosslinked products with cleavage of the anhydride. The resulting, extremely short pot lives have hitherto prevented polyanhydrides and polyamines from being used together in coating systems.

One possible solution to the problem is disclosed in DE-OS 2 853 477 which describes mixtures of blocked polyamines and polyanhydrides which have good pot lives, but harden on addition of water to form crosslinked products. Ketimines and aldimines obtained by reaction of polyamines with ketones and aldehydes are described as suitable blocked polyamines.

Compounds containing at least two cyclic carboxylic anhydride groups in the molecule, more especially reaction products of polyols with cyclic dianhydrides in a ratio of hydroxyl to anhydride groups of 1:2, or copolymers of an unsaturated cyclic anhydride with polyunsaturated compounds or α-olefins are mentioned as polyanhydrides.

The olefinically unsaturated compounds to be used in the production of the copolymers are discussed in only very broad terms in the general description of DE-OS 2 853 477; in particular, there is no reference whatever to the quantitative ratios between the individual monomers to be used in the production of the copolymers. The concrete disclosure of the Examples is confined to copolymers of butadiene oil and maleic anhydride in a ratio of 1:1 and to copolymers of wood oil with maleic anhydride. However, these copolymers are attended by disadvantages because their combination with bis-ketimines or bis-aldimines ultimately leads to heavily discolored products. In addition, coating compositions containing unsaturated oils, such as butadiene oil or wood oil, as binder component lead to coatings which tend readily to turn brittle and are not weatherproof.

In addition, the Examples of DE-OS 2 853 477 show that dimethylformamide is used as solvent in the processing of the binders specifically described therein, in addition to which unacceptable solids contents of only about 20% are used.

Another possibility of lengthening the pot lives is to use oxazolanes instead of the amines.

Water-hardenable compositions of oxazolanes and polyanhydrides are known in principle from DE-OS 2 610 406 where oxazolanes are combined with polyanhydrides to form water-hardenable sealing compounds and adhesives. Reaction products of polyunsaturated fatty acids with maleic anhydride and polyanhydrides of $C_3$-$C_6$ alkyl (meth)acrylate and maleic anhydride, more especially of butyl acrylate and maleic anhydride, are described as suitable polyanhydrides.

The systems specifically described in DE-OS 2 610 406 are still greatly in need of improvement in regard to their suitability for the production of high-quality, colorless paint films combining hardness with high resistance to solvents and chemicals. This applies both to the systems based on copolymers of maleic anhydride and butyl acrylate which are described in the Examples and to systems based on reaction products of maleic anhydride with polyunsaturated fatty acid esters which lead to yellowing end products.

The use of compounds containing unsaturated (meth)acrylate groups in combination with polyamines for lacquers and coating systems is known, for example, from EP-A 34720, 40288, 165 580, 167 042 and 203 296.

However, the reactivity of binder combinations such as these is in need of improvement. Even where selected catalyst systems are added, the degree of crosslinking is still not sufficient and requires at least very long reaction times, particularly where hardening is carried out at room temperature.

The object of the present invention is to provide new binder combinations which are suitable for the production of high-quality systems of adequate pot life optionally hardening under the effect of atmospheric moisture. The coatings obtained are intended to be clear, colorless, nonyellowing and solvent-resistant.

This object is achieved by the provision of the modified copolymers described in detail hereinafter and of the binder combinations containing the modified copolymers and blocked polyamines of the type described in detail hereinafter.

BRIEF DESCRIPTION OF THE INVENTION

In addition to A) copolymers containing chemically incorporated intramolecular carboxylic anhydride groups and chemically incorporated (meth)acrylate groups, the binders or binder combinations according to the invention described in detail hereinafter contain B) organic polyamines containing blocked amino groups. In the hardening of the binders, which takes place by a "double-cure" mechanism, there is an addition reaction between the unsaturated (meth)acrylate groups and the amino groups (released under the effect of moisture) in addition to the very fast reaction between the anhydride groups and the amino groups (released by the effect of moisture). Any hydroxyl groups additionally present in the binders may be added onto the anhydride groups so that there are numerous crosslinking possibilities, enabling high crosslink densities to be obtained. It is thus possible to satisfy even stringent requirements in regard to resistance to solvents and chemicals.

DETAILED DESCRIPTION

The present invention relates to modified copolymers having a weight average molecular weight of from 1,500 to 75,000 of olefinically unsaturated compounds containing chemically incorporated groups reactive to amino groups in an addition reaction, characterized in that the modified copolymers contain both
(i) intramolecular carboxylic anhydride groups and
(ii) olefinically unsaturated (meth)acrylate groups
in chemically bound form as the groups reactive to amino groups, the anhydride equivalent weight being in the range from 392 to 9,800 and the (meth)acrylate equivalent weight in the range from 284 to 7,100.

The present invention also relates to a process for the production of these modified copolymers which is characterized in that
in a first reaction step
  a) from 5 to 30 parts by weight copolymerizable, anhydride-functional monomers and
  b) 70 to 95 parts by weight of other copolymerizable monomers corresponding to general formulae (I) (II),

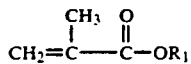  (I)

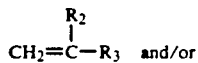  (II)

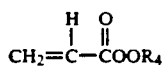  (III)

in which
R$_1$ is a linear or branched aliphatic hydrocarbon radical containing from 1 to 18 carbon atoms,
R$_2$ is hydrogen, a methyl group, an ethyl group, a chlorine or fluorine atom,
R$_3$ is an aromatic hydrocarbon radical containing 6 to 12 carbon atoms (by which are also meant aromatic radicals containing aliphatic substituents), a nitrile group, a carboxylate group containing 2 to 9 carbon atoms, an alkoxy group containing 2 to 7 carbon atoms or an aminocarbonyl group optionally bearing C$_1$–C$_6$ alkyl substituents–optionally containing ether bridges–at the nitrogen atom, and
R$_4$ corresponds in its meaning to the definition given for R$_1$, but need not be identical with R$_1$,
are converted by radical-initiated copolymerization into an anhydride-functional copolymer
and, in a second reaction step,
the copolymer thus obtained is modified by reaction with–based on the copolymerized anhydride groups–a subequivalent quantity of hydroxyl- or aminofunctional (meth)acrylates.

The present invention also relates to binders containing
A) 30 to 99 parts by weight modified copolymers of the type mentioned above,
B) 1 to 70 parts by weight of a polyamine component consisting of at least one organic polyamine containing blocked amino groups
and, optionally,
C) auxiliaries and additives, the nature of and quantitative ratios between components A) and B) being selected so that, for every blocked amino group of component B), there are in all 0.2 to 8 anhydride and (meth)acrylate groups of component A).

Finally, the present invention also relates to the use of these binders as, or in, moisture-hardening coating compositions and sealing compounds.

The modified copolymers according to the invention contain both intramolecular carboxylic anhydride groups and also olefinically unsaturated (meth)acrylate groups in chemically bound form and have a weight average molecular weight, as determined by gel permeation chromatography, of from 1,500 to 75,000, preferably from 3,000 to 50,000 and more preferably from 3,000 to 30,000. The anhydride equivalent weight (quantity in "g" containing 1 mol of chemically incorporated, intramolecular carboxylic anhydride groups) is in the range from 392 to 9,800 and preferably in the range from 784 to 4,900. The (meth)acrylate equivalent weight (quantity in "g" containing a total of 1 mol of chemically incorporated acrylate and/or methacrylate groups) is in the range from 284 to 7,100 and preferably in the range from 568 to 3,900.

The process according to the invention, i.e. the production of the modified copolymers, is carried out in a two-step reaction in which a copolymer A') containing intramolecular carboxylic anhydride groups is prepared in the first step and is then converted into the modified copolymers A) according to the invention in the second step by reaction with hydroxyl- or aminofunctional (meth)acrylates.

The copolymers A') are preferably prepared from a monomer mixture consisting of
  a) from 5 to 30 parts by weight copolymerizable monomers containing anhydride groups and
  b) from 70 to 95 parts by weight of other copolymerizable monomers corresponding to the general formulae

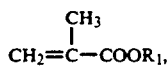  (I)

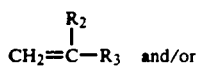  (II)

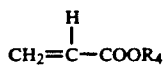  (III)

in which
R$_1$ is a linear or branched aliphatic hydrocarbon radical containing from 1 to 18 carbon atoms,
R$_2$ is hydrogen, a methyl group, an ethyl group, a chlorine atom or fluorine atom,
R$_3$ is an aromatic hydrocarbon radical containing 6 to 12 carbon atoms (by which are also meant aromatic radicals containing aliphatic substituents), a nitrile group, a carboxylate group containing 2 to 9 carbon atoms, an alkoxy group containing 2 to 7 carbon atoms or an amino carbonyl group optionally bearing C$_1$–C$_6$ alkyl substituents–optionally containing ether bridges–at the nitrogen atom and
R$_4$ corresponds in its meaning to the definition given for R$_1$, but need not be identical with R$_1$.

Typical examples of monomers a) are, for example, itaconic anhydride, maleic anhydride, maleic anhydride being preferred.

Particularly preferred monomers b) are those corresponding to the above general formulae in which R₁ is a linear or branched aliphatic hydrocarbon radical containing 1 to 8 carbon atoms, R₂ is hydrogen or a methyl group, R₃ is an aromatic hydrocarbon radical containing 6 to 12 carbon atoms (by which are also meant aromatic radicals containing aliphatic substituents), a nitrile group, a carboxylate group containing 2 to 9 carbon atoms, an alkoxy group containing 2 to 7 carbon atoms or an aminocarbonyl group optionally bearing $C_1-C_6$ alkyl substituents–optionally containing ether bridges–at the nitrogen and R₄ corresponds in its meaning to the definition just given for R₁.

Typical examples of suitable or preferred radicals R₁ and R₄ are methyl, ethyl, n-propyl, isopropyl, n-butyl, isobutyl, n-pentyl, n-hexyl, 2-ethylhexyl, n-octyl, n-decyl or n-dodecyl radicals.

Typical examples of suitable or preferred substituents R₂ are hydrogen, methyl groups, ethyl groups, chlorine or fluorine atoms.

Typical examples of suitable or preferred radicals R₃ are aliphatic radicals of the type just mentioned by way of example for R₁, except for methyl, and in addition phenyl, cyclohexyl, 2-, 3- and 4-methylphenyl, propoxy, n-butoxy, acetyl, propionyl, n-butyryl or N-methoxymethyl aminocarbonyl radicals.

Particularly preferred components for the production of the copolymers A') are those copolymers corresponding to the above definitions in which a) from 5 to 30 parts by weight and more especially from 8 to 25 parts by weight maleic anhydride, b) from 5 to 85 parts by weight and more especially from 25 to 73 parts by weight monomers corresponding to the following formulae

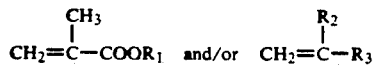

and from 10 to 65 parts by weight and more especially from 19 to 50 parts by weight monomers corresponding to the following formula

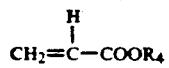

are present in copolymerized form.

In a particularly preferred embodiment, component A') is a copolymer corresponding to the above definition in which–per 100 parts by weight maleic anhydride–from 40 to 140 parts by weight of other monomers selected from the group consisting of styrene, vinyl toluene, α-methyl styrene, α-ethyl styrene, nucleus-substituted diethyl styrenes, isopropyl styrenes, butyl styrenes and methoxy styrenes optionally representing isomer mixtures, ethyl vinyl ether, n-propyl vinyl ether, isopropyl vinyl ether, n-butyl vinyl ether, isobutyl vinyl ether, vinyl acetate, vinyl propionate, vinyl butyrate and mixtures of these monomers are present in copolymerized form, optionally in addition to other comonomers.

The copolymers A') may be prepared by copolymerization of the monomers mentioned by way of example by standard radical polymerization processes, such as for example bulk or solution polymerization.

The monomers are copolymerized at temperatures in the range from 60° to 200° C. and preferably at temperatures in the range from 80° to 160° C. in the presence of radical formers and, optionally, molecular weight regulators.

The copolymerization is preferably carried out in inert solvents at solids contents of 30 to 95% by weight. Suitable solvents are, for example, aromatic hydrocarbons, such as benzene, toluene, xylene; esters, such as ethyl acetate, butyl acetate, methyl glycol acetate, ethyl glycol acetate, methoxypropyl acetate; ethers, such as tetrahydrofuran, dioxane, diethylene glycol dimethyl ether; ketones, such as acetone, methyl ethyl ketone, methyl isobutyl ketone.

The copolymerization may be carried out continuously or discontinuously. Normally, the monomer mixture and the initiator are introduced uniformly and continuously into a polymerization reactor and the corresponding quantity of polymer is continuously removed at the same time. It is thus possible with advantage to produce chemically substantially uniform copolymers. Chemically substantially uniform copolymers may also be produced by allowing the reaction mixture to run at a constant rate into a stirred vessel without removal of the polymer.

It is also possible, for example, initially to introduce part of the monomers, for example in solvents of the type mentioned, and to add the remaining monomers and auxiliaries either separately or together to the monomers initially introduced at the reaction temperature.

In general, the polymerization is carried out at an excess pressure of 0 to 20 bar. The initiators are used in quantities of from 0.05 to 15% by weight, based on the total quantity of monomers.

Suitable initiators are standard radical initiators such as, for example, aliphatic azo compounds, such as azodiisobutyronitrile, azo-bis-2-methyl valeronitrile, 1,1'-azo-bis-1-cyclohexane nitrile and 2,2'-azo-bis-isobutyric acid alkyl ester; symmetrical diacyl peroxides, for example acetyl, propionyl or butyryl peroxide, bromine-, nitro-, methyl- or methoxy-substituted benzoyl peroxides, symmetrical peroxydicarbonates, for example diethyl, diisopropyl, dicyclohexyl and also dibenzoyl peroxydicarbonate; tert.-butyl peroctoate, tert.-butyl perbenzoate or tert.-butyl phenyl peracetate, and also peroxycarbonates such as, for example, tert.-butyl-N-(phenylperoxy)-carbonate or tert.-butyl-N-(2-, 3- or 4-chlorophenylperoxy)-carbonate; hydroperoxides, such as for example tert.-butyl hydroperoxide, cumene hydroperoxide; dialkyl peroxides, such as dicumyl peroxide, tert.-butyl cumyl peroxide or di-tert.-butyl peroxide.

To regulate the molecular weight of the copolymers, standard regulators may be used during their production, including for example tert.-dodecyl mercaptan, n-dodecyl mercaptan or diisopropyl xanthogene disulfide. The molecular weight regulators may be added in quantities of from 0.1 to 10% by weight, based on the total quantity of monomers.

The solutions of the copolymers A') obtained during the copolymerization reaction may then be used for the modification reaction without further working up. However, it is of course also possible to free the copolymers from any residues of unreacted monomers still present and from solvent and to modify the copolymers A') present as distillation residue.

To produce the modified copolymers A), the copolymers A') containing carboxylic anhydride groups are reacted with hydroxyl- or aminofunctional (meth)acrylates in such a way that the cyclic anhydride groups are partially opened by an addition reaction of the functional (meth)acrylates mentioned with formation of a semiester or semiamide structure. Modified copolymers A) are then present, containing both unsaturated (meth)acrylate groups and also intramolecular carboxylic anhydride groups in chemically bound form.

The ring-opening reaction of the cyclic carboxylic anhydride groups in the described copolymers A') by aminofunctional (meth)acrylates, such as for example N-tert.butyl aminoethyl methacrylate, takes place even at low temperatures, such as room temperature for example. However, it is of advantage to accelerate the reaction by heating to 120° C. To suppress unwanted secondary polymerization reactions, it is best to use polymerization inhibitors such as, for example, hydroquinone or hydroquinone monomethyl ether.

The corresponding ring-opening reaction by hydroxylfunctional (meth)acrylates, such as for example hydroxyethyl (meth)acrylate, requires temperatures in the range from 70° to 150° C. and preferably in the range from 80° to 130° C. This reaction is also best carried out in the presence of polymerization inhibitors of the type mentioned by way of example above. The ring-opening reaction of the cyclic carboxylic anhydride groups may be carried out, for example, with any (meth)acrylates having a molecular weight in the range from 116 to 1,500 or mixtures thereof which contain one free hydroxy group or one primary or secondary amino group. These products may also contain several (meth)acrylate groups. For example, it is possible to use hydroxyethyl acrylate, hydroxyethyl methacrylate, 2-hydroxypropyl acrylate, 2-hydroxypropyl methacrylate, 2-hydroxybutyl acrylate, glycerol diacrylate, glycerol dimethacrylate, trimethylolpropane diacrylate, trimethylolpropane dimethacrylate, pentaerythritol triacrylate, penterythritol trimethacrylate, mono(meth)acrylates of polyethoxylated or propoxylated ethylene or propylene glycol, dimethacrylates of polyethoxylated or propoxylated trimethylolpropane, tri(meth)acrylates of polyethoxylated or propoxylated pentaerythritol, N-tert.-butylamino ethyl methacrylate.

Tertiary amines acting as catalysts, such as for example triethylamine or tributylamine, may additionally be added to accelerate the ring-opening reaction.

In the second step of the process according to the invention, i.e. the modification of the copolymers A'), the hydroxyl- or aminofunctional (meth)acrylates mentioned by way of example are generally used in such quantities that, for every carboxylic anhydride group in the copolymers A'), there are from 0.01 to 0.99 hydroxyl groups and/or amino groups of the unsaturated modification component.

As already mentioned, the modification reaction may be carried out both in the absence of organic solvents of the type mentioned by way of example or even in the presence of the solvents used in the production of the copolymers A').

In addition to the modified copolymers A), the binders according to the invention contain organic polyamines containing blocked amino groups as hardener B). "Blocked amino groups" are understood to be groups which react with water with release of primary and/or secondary amino groups. Particularly preferred blocked polyamines B) are compounds which contain aldimine, ketimine, oxazolane, hexahydropyrimidine and/or tetrahydroimidazole groups and which, at the same time, may also contain several of these groups.

The blocked polyamines B) have a weight average molecular weight in the range from 86 to 10,000 and preferably in the range from 250 to 4,000 and, on a statistical average, contain from 1 to 50, preferably from 2 to 10 and more preferably from 2 to 4 structural units corresponding to the following general formulae

in which $R_5$ and $R_6$ may be the same or different and represent hydrogen, aliphatic hydrocarbon radicals containing from 1 to 18 carbon atoms cycloaliphatic hydrocarbon radicals containing from 5 to 10 carbon atoms, araliphatic hydrocarbon radicals containing from 7 to 18 carbon atoms or phenyl radicals; the two substituents $R_5$ and $R_6$ may also form a 5-membered or 6-membered cycloaliphatic ring together with the adjacent carbon atom and, preferably, at most one of these substituents is hydrogen, and $R_7$ is a difunctional aliphatic hydrocarbon radical containing 2 to 6 carbon atoms, with the proviso that 2 or 3 carbon atoms are arranged between the two nitrogen atoms.

The molecular weights mentioned may be determined by the method of gel permeation chromatography (molecular weights above 1,000) or from the stoichiometry of the starting materials used for the production of the compounds (molecular weights up to 1,000).

Components B) preferably used are, for example, those containing hexahydropyrimidine or tetrahydroimidazole structures corresponding to general formula (IV), in which $R_5$ and $R_6$ may be the same or different and represent aliphatic hydrocarbon radicals containing 2 to 10 carbon atoms; one of these substituents may also be hydrogen and $R_7$ may be an optionally alkyl-substituted ethylene or trimethylene radical.

The blocked polyamines of the type mentioned are produced in known manner by reaction of corresponding aldehydes or ketones with the corresponding polyamines.

Aldehydes or ketones suitable for the production of the compounds B) containing hexahydropyrimidine or tetrahydroimidazole groups are, for example, those corresponding to the following general formula:

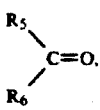

which preferably have a molecular weight of from 72 to 200 (ketones) or from 58 to 250 (aldehydes).

Examples of such aldehydes and ketones are acetone, methyl ethyl ketone, methyl propyl ketone, methyl isopropyl ketone, methyl-n-butyl ketone, methyl isobutyl ketone, methyl-n-amyl ketone, methyl isoamyl ketone, methyl heptyl ketone, diethyl ketone, ethyl butyl ketone, ethyl amyl ketone, diisopropyl ketone, diisobutyl ketone, cyclohexanone, isophorone, methyl-tert.-butyl ketone, 5-methyl-3-heptanone, 4-heptyl ketone, 1-phenyl-2-propanone, acetophenone, methyl nonyl ketone, 3,3,5-trimethyl cyclohexanone, formaldehyde, acetaldehyde, propionaldehyde, butyraldehyde, isobutyraldehyde, trimethyl acetaldehyde, 2,2-dimethyl propanal, 2-ethyl hexanal, 3-cyclohexene-1-carboxaldehyde, hexanal, heptanal, octanal, valeraldehyde, benzaldehyde, tetrahydrobenzaldehyde, hexahydrobenzaldehyde, acrolein, crotonaldehyde, propargylaldehyde, p-tolylaldehyde, 2-methyl pentanal, 3-methyl pentanal, phenyl ethanal, 4-methyl pentanal.

Aldehydes and ketones preferably used for the production of the compounds containing hexahydropyrimidine or tetrahydroimidazole groups are butyraldehyde, isobutyraldehyde, trimethyl acetaldehyde, 2,2-dimethyl propanal, 2-ethyl hexanal, hexanal, 3-cyclohexane-1-carboxaldehyde, heptanal, octanal, hexahydrobenzaldehyde, 2-methyl pentanal, cyclohexanone, cycloheptanone, methyl isopropyl ketone, acetone, 3,3,5-trimethyl cyclohexanone and methyl cyclohexanone.

It is of course also possible to use mixtures of different ketones and aldehydes and also mixtures of ketones with aldehydes to obtain special properties.

The polyamines used for the production of the compounds containing hexahydropyrimidine or tetrahydroimidazole groups are, in particular, organic compounds containing at least two primary and/or secondary amino groups.

Suitable polyamines are, for example, those corresponding to the following general formula

in which $R_7$ is as defined above and $R_8$ and $R_9$ may be the same or different and represent hydrogen, aliphatic hydrocarbon radicals containing from 1 to 10 and preferably from 1 to 4 carbon atoms, cycloaliphatic hydrocarbon radicals containing from 5 to 10 and preferably 6 carbon atoms or aromatic hydrocarbon radicals containing from 7 to 15 and preferably 7 carbon atoms, the hydrocarbon radicals mentioned, particularly the aliphatic hydrocarbon radicals mentioned, optionally containing heteroatoms, such as oxygen, nitrogen or sulfur in the form of ether, ester, amide, urethane, oxirane, ketone, lactam, urea, thioether, thioester or lactone groups; the radicals may also contain reactive hydroxyl or amino groups.

Particularly preferred polyamines are those in which $R_8$ and $R_9$ may be the same or different and represent hydrogen and/or $C_1$-$C_6$ alkyl radicals, such as methyl, ethyl, n-propyl, isopropyl, n-butyl, isobutyl, tert.-butyl, n-pentyl or n-hexyl radicals, or in which at least one of the substituents $R_8$ and $R_9$ is a group of the type obtained by addition of an amine hydrogen atom onto an olefinically unsaturated compound. Olefinically unsaturated compounds suitable for the production of modified polyamines such as these are, for example, derivatives of (meth)acrylic acid, such as esters, amides, nitriles or, for example, aromatic compounds, such as styrene, α-methyl styrene, vinyl toluene or, for example, vinyl esters, such as vinyl acetate, vinyl propionate, vinyl butyrate or, for example, vinyl ethers, such as ethyl vinyl ether, propyl vinyl ether, butyl vinyl ether, or monoesters and diesters of fumaric acid, maleic acid or tetrahydrophthalic acid.

$R_8$ and/or $R_9$ may also represent an aminoalkyl or hydroxyalkyl radical containing, for example, 2 to 4 carbon atoms.

Especially preferred polyamines are ethylenediamine, 1,2-propylenediamine, 1,3-propylenediamine, 1,2- and 1,3-butylenediamine, diethylenetriamine and derivatives of these polyamines.

Compounds containing oxazolane groups of general formula (V) suitable for use as component B) are preferably those in which $R_5$ and $R_6$ may be the same or different and represent hydrogen or aliphatic hydrocarbon radicals containing 1 to 18 and more especially 1 to 8 carbon atoms, or in which the substituents $R_5$ and $R_6$, together with the carbon atom of the heterocyclic ring, form a cycloaliphatic ring containing in all from 4 to 9 carbon atoms, more especially a cyclohexane ring, with the proviso that at most one of the substituents $R_5$ and $R_6$ is hydrogen, and $R_7$ is an alkenyl radical containing 2 to 4 and preferably 2 to 3 carbon atoms, with the proviso that at least 2 carbon atoms are arranged between the oxygen atom and the nitrogen atom.

The oxazolane-containing component B) is produced in known manner by reaction of corresponding aldehydes or ketones having the following formula

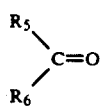

with suitable hydroxyamines of the type mentioned in more detail hereinafter.

Basically, suitable aldehydes or ketones are those of the type already mentioned by way of example in the foregoing. Preferred aldehydes or ketones in this case are butyraldehyde, isobutyraldehyde, trimethyl acetaldehyde, 2,2-dimethyl propanal, 2-ethyl hexanal, 3-cyclohexene-1-carboxaldehyde, hexahydrobenzaldehyde, cyclopentanone, cyclohexanone, methyl cyclopentanone, methyl cyclohexanone, 3,3,5-trimethyl cyclohexanone, cyclobutane, methyl cyclobutane, acetone, methyl ethyl ketone and methyl isobutyl ketone.

It is of course also possible to use mixtures of different ketones and aldehydes and also mixtures of ketones with aldehydes to obtain special properties.

Hydroxyamines are, in particular, organic compounds which contain at least one aliphatic group and at least one aliphatically bound hydroxyl group. The hydroxyamines generally have a molecular weight in the range from 61 to 500 and preferably in the range from 61 to 300.

Suitable hydroxyamines are, for example, bis-(2-hydroxyethyl)-amine, bis-(2-hydroxypropyl)-amine, bis-(2-hydroxybutyl)-amine, bis-(3-hydroxypropyl)-amine, bis-(3-hydroxyhexyl)-amine, N-(2-hydroxypropyl)-N-(2-hydroxyethyl)-amine, 2-(methylamino)-ethanol, 2-(ethylamino)ethanol, 2-(propylamino)-ethanol, 2-(butylamino)-ethanol, 2-amino-2-methyl-1-propanol,2-amino-2-ethyl-1-propanol,2-amino-2-propyl-1-propanol, 2-amino-2-methylpropane-1,3diol, 2-amino-3-methyl-3-hydroxybutane, propanolamine, ethanolamine.

Particularly preferred hydroxyamines are bis-(2-hydroxyethyl)-amine, bis-(2-hydroxypropyl)-amine, bis-(2-hydroxybutyl)-amine, bis-(3-hydroxyhexyl)-amine, 2-(methylamino)-ethanol, 2-(ethylamino)-ethanol, 2-amino-2-methyl1-propanol, 2-amino-2-ethyl-1-propanol, propanolamine and ethanolamine.

Preferred compounds containing aldimine or ketimine groups are those which contain structural units having the following general formula

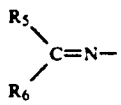

in which

R$_5$ and R$_6$ may be the same or different and represent hydrogen or aliphatic hydrocarbon radicals containing 1 to 8 carbon atoms which may also be attached together with the carbon atom to form a cycloaliphatic ring, more especially a cyclohexane ring.

In principle, the aldehydes or ketones already mentioned by way of example in the foregoing are suitable for the production of these compounds. Preferred aldehydes or lo ketones in this case are butyraldehyde, isobutyraldehyde, trimethyl acetaldehyde, 2,2-dimethyl propanal, 2-ethyl hexanal, 3-cyclohexene-1-carboxaldehyde, hexahydrobenzaldehyde and, in particular, ketones which have a boiling point below 170° C. and which show high volatility at room temperature, including for example methyl isobutyl ketone, methyl isopropyl ketone, diethyl ketone, diisobutyl ketone, methyl tert.-butyl ketone.

It is of course also possible to use mixtures of different ketones or aldehydes and also mixtures of ketones with aldehydes to obtain special properties.

The polyamines used for the production of component B) containing ketimine or aldimine groups are, in particular, organic compounds containing at least two aliphatically and/or cycloaliphatically bound primary amino groups. However, the use of polyamines containing aromatic amino groups is also possible, although less preferred. The polyamines generally have a molecular weight of from 60 to 500 and preferably from 88 to 400, although it is also possible to use relatively high molecular weight, amino-terminated prepolymers as the polyamine component in the production of component B).

Particularly preferred polyamines are diprimary aliphatic or cycloaliphatic diamines such as, for example, tetramethylenediamine, hexamethylenediamine, isophoronediamine, bis-(4-aminocyclohexyl)-methane, bis-aminomethyl hexahydro-4,7-methanoindane, 1,4-cyclohexanediamine, 1,3-cyclohexandiamine, 2-methyl cyclohexanediamine, 4-methyl cyclohexanediamine, 2,2,5-trimethyl hexanediamine, 2,2,4-trimethyl hexanediamine, butane-1,4-diol bis-(3-aminopropyl)-ether, 2,5-diamino-2,5-dimethyl hexane, bis-aminoethyl cyclohexane, bis-(4-amino-3,5-dimethylcyclohexyl)methane or mixtures thereof.

Tetramethylenediamine, hexamethylenediamine, isophoronediamine, bis-aminomethyl cyclohexane, 1,4-cyclohexanediamine, bis-aminomethyl hexahydro-4,7-methanoindane and bis-(4-aminocyclohexyl)-methane are particularly preferred.

In addition to these preferred diamines, prepolymers terminated by primary amino groups, i.e. compounds containing at least two terminal amino groups and having a molecular weight of from 500 to 5,000 and preferably from 500 to 2,000, may also be used for the production of the aldimines or ketimines. These compounds include, for example the aminopolyethers known per se from polyurethane chemistry, of the type described for example in EP-A 0 081 701, or reaction products-for example containing amide, urea, urethane or secondary amino groups-of at least difunctional carboxylic acids, isocyanates or epoxides with diamines of the type mentioned by way of example above, these reaction products also containing at least two primary amino groups. Mixtures of such relatively high molecular weight polyamines with the low molecular weight polyamines mentioned may also be used.

Aromatic polyamines which, in principle, are also suitable, but less preferred, for the production of the aldimines or ketimines include, for example, 2,4- and 2,6-diaminotoluene, 1,4-diaminobenzene or 4,4'-diaminodiphenyl methane.

Component B), which may contain aldimine, ketimine, oxazolane, hexahydropyrimidine or tetrahydroimidazole groups, is prepared by reaction of the starting components, generally in such quantitative ratios that the amino compounds are present in a 1 to 1.5-fold molar excess, based on the carbonyl groups, according to the particular reaction required. Catalytic quantities of acidic substances, such as for example p-toluenesulfonic acid, hydrochloric acid, sulfuric acid, aluminium(III) chloride, tin compounds, may optionally be used to accelerate the reaction.

The reaction is generally carried out at a temperature in the range from 60° to 180° C., the reaction being carried out in the presence of an entraining agent to remove the water of reaction until the calculated quantity of water has been eliminated or until no more water is eliminated.

The entraining agent and any unreacted starting materials present are then removed by distillation. Suitable entraining agents are, for example, toluene, xylene, cyclohexane, octane. The crude products thus obtained may be used without further purification as component B) for the production of the binder combinations. Where the purity of component B) has to meet particularly stringent requirements, it is also possible to obtain components B) in pure form, for example by distillation.

The preferred, blocked polyamines of component B) also include those which contain 2 to 1? structural units corresponding to general formula (IV), (V) or (VI) and which are obtained by linkage of different compounds containing such structural units to form, for example, ester, ether, amide, urea and/or urethane bonds.

The compounds containing structural units corresponding to the above formulae, which are to be linked to one another in this way, must contain at least one primary or secondary amino group or at least one hydroxyl group in non-blocked form. Suitable modifying agents, which are suitable for linking the compounds mentioned, are for example, polyisocyanates, polyepoxides, polycarboxylic acids and polyacryloyl compounds.

Polyisocyanates suitable for this modification reaction are, for example, aliphatic, cycloaliphatic, araliphatic, aromatic and heterocyclic polyisocyanates of the type described, for example, by W. Siefken in Justus Liebigs Annalen der Chemie, 562, pages 75 to 1346, for example 1,4-tetramethylene diisocyanate, 1,6-hexamethylene diisocyanate, 1,12-dodecane diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethyl cyclohexane, 2,4- and 2,6-hexahydrotolylene diisocyanate, hexahydro-1,3- and -1,4-phenylene diisocyanate, perhydro-2,4'- and/or -4,4,-diphenyl methane diisocyanate, 1,3-phenylene diisocyanate, 1,4-phenylene diisocyanate, 2,4-tolylene diisocyanate, 2,6-tolylene diisocyanate, diphenyl methane-2,4'- and/or -4,4 -diisocyanate, naphthylene-1,5-diisocyanate, mixtures of these and other polyisocyanates, polyisocyanates containing carbodiimide groups (for example DE-OS 10 92 007), polyisocyanates containing allophanate groups (for example GB-P 944,890), polyisocyanates containing isocyanurate groups (for example DE-PS 10 22 789, DE-PS 12 22 067), polyisocyanates containing urethane groups (for example U.S. Pat. No. 3,394,164) or polyisocyanates obtained by reaction of at least difunctional hydroxy compounds with excess, at least difunctional isocyanates, polyisocyanates containing biuret groups (for example DE-PS 11 01 394) and prepolymers or polymers containing at least two isocyanate groups.

Representatives of these compounds, which may be used in accordance with the invention, are described, for example, in High Polymers, Vol. XVI, "Polyurethanes, Chemistry and Technology", Interscience Publishers, New York/London, Vol. I, 1962, pages 32 to 42 and 45 to 54 and Vol. II, 1964, pages 5-6 and 198-199 and in Kunststoff Handbuch, Vol. VII, Vieweg-Hochtlen, Carl-Hanser-Verlag, Munchen, 1966, pages 45 to 72.

Polyepoxides suitable for the modification reaction mentioned above are, for example, aliphatic, cycloaliphatic, araliphatic, aromatic and heterocyclic compounds containing at least two epoxide groups, such as for example epoxidized esters of aliphatic, polybasic acids with unsaturated monohydric alcohols, glycidyl ethers of polyhydroxy compounds, glycidyl esters of polycarboxylic acids, copolymers containing epoxide groups.

Polycarboxylic acids suitable for the modification reaction are, for example, aliphatic, cycloaliphatic, araliphatic, aromatic and heterocyclic compounds containing at least two carboxyl groups, such as for example adipic acid, dimeric fatty acid, phthalic acid, terephthalic acid, isophthalic acid, fumaric acid, maleic acid, succinic acid, trimellitic acid, pyromellitic acid, copolymers containing (meth)acrylic acid, acidic polyesters or acidic polyamides.

Instead of the acids mentioned by way of example, it is also possible to use the corresponding anhydrides (providing the acids in question form intramolecular anhydrides) or the corresponding simple alkyl esters, particularly methyl esters, for the modification reaction.

Compounds containing at least two olefinic double bonds of the type mentioned above, which are suitable for the modification reaction, are in particular derivatives of acrylic acid or methacrylic acid, such as for example hexanediol-bis-(meth)acrylate, trimethylolpropane tris(meth)acrylate, pentaerythritol tetra-(meth)acrylate, OH-functional polyesters or polyacrylates esterified with acrylic acid, diethylene glycol dimethacrylate, reaction products of polyisocyanates with hydroxyalkyl (meth)acrylate.

In the modification reaction to produce components B) of relatively high functionality, it is also possible to use mixtures of different blocked amines which contain at least one free hydroxyl group or amino group reactive to the modifying agent.

Polyamines containing ketimine or aldimine groups, which still contain at least one free primary or secondary amino group or a free hydroxyl group, are obtained, for example, by reaction of at least difunctional amines with ketones and/or aldehydes in such equivalent ratios that at least one amino group remains free.

Even where, for example, polyamines containing at least one secondary amino group in addition to primary amino groups are used, the reaction with aldehydes or ketones results in the formation of aldimines or ketimines which contain at least one free secondary amino group (where an equivalent ratio of primary amino groups to carbonyl groups of 1:1 has been used) or which contain free primary amino groups in addition to at least one secondary amino group (where the carbonyl compounds have been used in less than the equivalent quantity, based on the primary amino groups). Primary/secondary polyamines such as these are, for example, diethylenetriamine, triethylenetetramine, tetraethylenepentamine, dipropylenetriamine, tripropylenetetramine.

Compounds containing oxazolane groups, which also have at least one reactive primary or secondary amino group or a hydroxy group, are obtained for example by reaction of hydroxyamines containing at least one other hydroxy group and/or primary or secondary amino group in addition to a hydroxy group and a secondary amino group or by reaction of suitable hydroxyamines containing a hydroxy group and a primary amino group in suitable equivalent ratios with ketones and/or aldehydes of the type described, for example, in the foregoing. Suitable hydroxyamines are, for example, bis-(2-hydroxyethyl)-amine, bis-(2-hydroxypropyl)-amine, bis-(2-hydroxybutyl)-amine, bis-(3-hydroxypropyl)-amine, bis-(3-hydroxyhexyl)-amine, N-(2-hydroxypropyl)-N-(6-hydroxyhexyl)-amine, 2-amino-2-methyl-1-propanol, 2-amino-2-methylpropane- 1,3-diol, 2-amino-3-methyl-3-hydroxybutane, aminoethanol.

The hydroxyamines containing oxazolane groups, which also have at least one free primary or secondary amino group or a hydroxy group, are prepared by reaction of the starting components mentioned in such an equivalent ratio of amino or hydroxy groups to aldehyde or ketone groups that at least one primary or secondary amino group or a hydroxy group is not blocked and is available for the subsequent reaction with the reactant used as modifying agent.

Compounds containing hexahydropyrimidine or tetrahydroimidazole groups, which also have at least one reactive primary or secondary amino group or a hydroxy group, are obtained for example by reaction of hydroxyamines containing two secondary amino groups in addition to at least one hydroxy group, such as for example N-methyl-N'-4-hydroxytetramethylenediamine, or by reaction of polyamines containing at least one primary amino group or at least two other secondary amino groups in addition to at least one secondary amino group, such as for example N-methyl- 1,3-diaminoethane, N-methyl-1,3-diaminopropane, N-methyl-1,3-diaminobutane, diethylenetriamine, N-methyl diethylenetriamine, N,N-bis-(3-aminopropyl)-amine, N,N'-dimethyl diethylenetriamine.

The compounds containing hexahydropyrimidine or tetrahydroimidazole groups, which also have at least one free primary or secondary amino group or a hydroxyl group, are prepared by reaction of the starting compounds mentioned in such an equivalent ratio of amino or hydroxy groups to aldehyde or keto groups that at least one primary or secondary amino group or a hydroxyl group is not blocked and is available for the subsequent reaction with the reactant used as modifying agent.

The following structural units, which are suitable for the synthesis of relatively high molecular weight components B) of the type in question containing ester, ether, amide, urea, urethane bonds, are mentioned by way of example for the purposes of further illustration:

bisketimine of diethylenetriamine and acetone

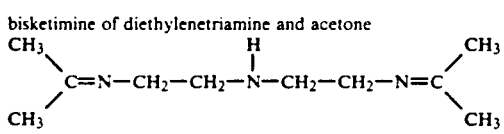

aldimine of isophoronediamine and isobutyraldehyde

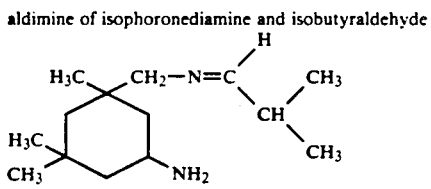

oxazolane of diethanolamine and isobutyraldehyde

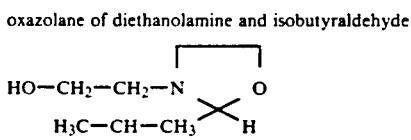

hexahydropyrimidine of N-methyl-1,3-diaminopropane and cyclohexanone

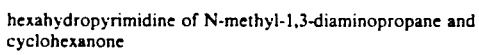

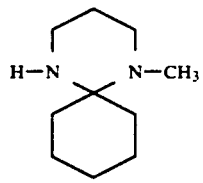

If the modifying agents mentioned by way of example above are reacted with hexahydropyrimidines or tetrahydroimidazoles containing free primary or secondary amino or hydroxyl groups, hexahydropyrimidines or tetrahydroimidazoles of higher functionality are formed. The same applies to the modification of aldimines or ketimines and to the modification of oxazolanes.

However, if the modifying agents are reacted with mixtures of hexahydropyrimidines, tetrahydroimidazoles, aldimines, ketimines and/or oxazolanes containing free primary or secondary amino or hydroxyl groups, crosslinking components B) are formed in which hexahydropyrimidines, tetrahydroimidazoles, ketimines, aldimines and/or oxazolanes are chemically linked to one another.

Accordingly, various compounds suitable as component B) may be obtained by these modification or crosslinking reactions.

The modification reaction is normally carried out in a solvent of the type mentioned by way of example above at reaction temperatures of 30° to 180° C., optionally using a water separator.

In general, an equivalent ratio is selected between reactive groups of the blocked polyamines and the reactive groups of the "modifying agent". However, it is also possible to use the "modifying agents" in less than equivalent quantities, for example in 0.75 to 0.99 times the equivalent quantity.

Polyamines suitable as component B), which may be obtained by the modification reactions mentioned, are for example compounds corresponding to the following formulae:

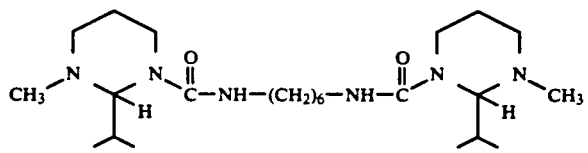

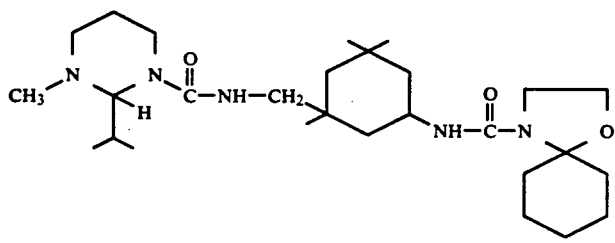

-continued

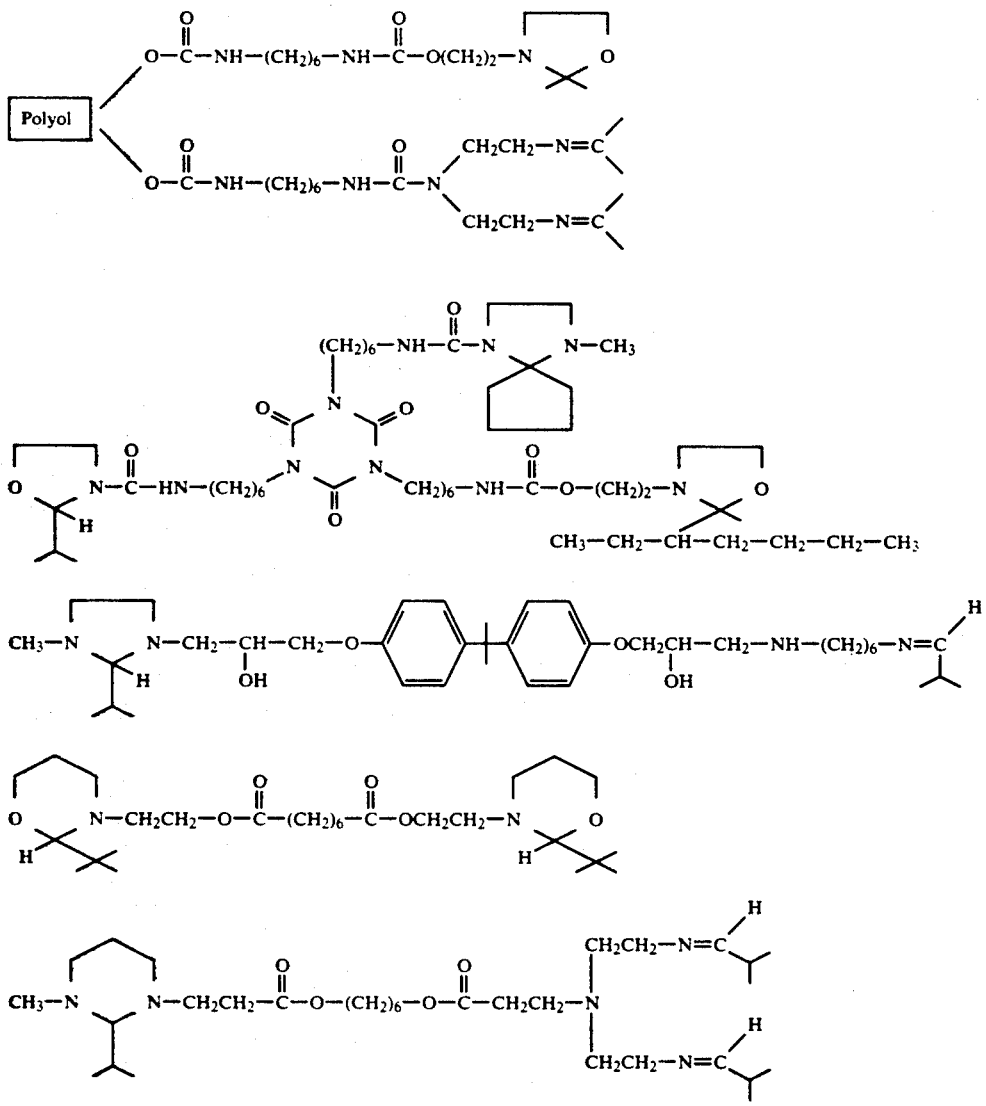

In addition to the essential components A) and B), the binders according to the invention may contain auxiliaries and additives of various kinds as further components C).

These various auxiliaries and additives include, for example, C1) monohydric and/or polyhydric alcohols which may be present in the binders in quantities of up to 20 parts by weight, based on 100 parts by weight of the combinations of A) and B).

Suitable monohydric alcohols are, for example, ethanol, n-propanol, isopropanol, n-butanol, sec.-butanol, tert.-butanol, n-pentanol, isopentanol, n-hexanol, isohexanol, cyclopentanol, cyclohexanol, heptanol, octanol, methyl glycol, ethyl glycol, propyl glycol, isopropyl glycol, butyl glycol, methyl diglycol, ethyl diglycol, propyl diglycol, butyl diglycol, methyl triglycol, hexyl glycol, propylene glycol monomethyl ether, tripropylene glycol monoethyl ether, dipropylene glycol monomethyl ether, glycolic acid alkyl ester, lactic acid alkyl ester, 2-ethyl butanol, 2-ethyl hexanol, 3-methoxybutanol, diacetone alcohol, furfuryl alcohol, tetrahydrofurfuryl alcohol, capryl alcohol, capric alcohol, lauric alcohol, myristic alcohol, palmitic alcohol, stearic alcohol, arachic alcohol, behenic alcohol, lignoceric alcohol, lauroleic alcohol, myristoleic alcohol, palmitoleic alcohol, oleic alcohol, gadoleic alcohol, erucic alcohol, linoleic alcohol, linolenic alcohol, licanic alcohol, arachidonic alcohol, synthetic fatty alcohols and mixtures of these and other monoalcohols.

Suitable polyhydric alcohols are, for example, copolymers known per se of acrylic acid derivatives, methacrylic acid derivatives, aromatic vinyl compounds, vinyl ethers and vinyl esters which contain hydroxyl-functional monomers, such as hydroxyalkyl (meth)acrylates for example, in copolymerized form. Copolymers such as these are described, for example, in EP-A-64 338, EP-A-134 691, Ep-A-103 199, EP-A-48 128.

Other polyhydric alcohols are hydroxyl-functional polyester resins known per se, of the type described for example in H. Wagner/H. F. Sarx, Lackkunstharze, Carl-Hanser-Verlag Munchen 1971, pages 86 et seq.

Other polyhydric alcohols are, for example, hydroxylfunctional polyether compounds such as, for example, the alkoxylation products of low molecular weight, polyhydric alcohols of the type mentioned by way of example in the following.

Other suitable polyhydric alcohols are, for example, simple polyhydric alcohols, such as neopentyl glycol, hexanediol, butanediol, 1,4-cyclohexanediol, 1,4-cyclohexane dimethanol, ethylene glycol, glycerol, trimethylolpropane, propane-1,2-diol, propane-1,3-triol, pentane-1,5-diol, octadecane-1,12-diol, 2-butene-1,4-diol, 2-butyne-1,4-diol, pentaerythritol, 4,4-(1-methylethylidene)-bis-cyclohexanol, bis-hydroxymethyl hexahydro-4,7-methanoindane, 2,2-bis-n-(2-hydroxyethoxy)-phenyl propane.

Other suitable polyhydric alcohols are, for example, reaction products of caprolactone with the alcohols mentioned.

Finally, other suitable polyhydric alcohols are hydroxyl-functional polyaddition compounds, of the type obtainable from excess quantities of polyhydroxyl compounds of the type mentioned by way of example with organic polyisocyanates of the type mentioned by way of example.

The binder combinations according to the invention may also contain C2) catalysts as further auxiliaries. Suitable catalysts are, in particular, tertiary amines having a molecular weight in the range from 89 to 1,000, such as for example 1,4-diazabicyclo-(2,2,2)-octane, triethylamine, triethanolamine, dimethyl ethanolamine, methyl diethanolamine, diethyl hexanolamine, N,N,N',N'-tetramethyl ethylenediamine, N,N-dimethyl-1,3-propanediamine, 1,8-diazabicyclo-(5,4,0)-undec-7-ene.

Finally, the binder combinations according to the invention may contain, for example, solvents or diluents, levelling aids, antioxidants, fillers, pigments and UV absorbers as further auxiliaries and additives C).

The binders or binder combinations according to the invention are prepared by mixing the starting components A) and B) and, optionally, the auxiliaries and additives C) with one another. Where solvents or diluents are used as component C), they may already have been added to one or more of the individual components or; alternatively, may be added to the mixture of components A) and B). In one possible embodiment in particular, the solvents or diluents are actually present during the preparation of one or more starting components, as described for example in the foregoing with reference to the production of the copolymers. The solvents or diluents should be substantially anhydrous to ensure an adequate pot life of the mixtures. Solvents or diluents are generally used in the quantities necessary to establish suitable processing viscosities of the combinations according to the invention. The solvent content of the binders according to the invention to be used in accordance with the invention is generally between 10 and 80% by weight. However, it is also possible in principle by using suitable, comparatively low molecular weight copolymers A) to reduce the solvent or diluent content even further or to eliminate the need to use such auxiliaries altogether.

In one preferred embodiment of the process according to the invention, compounds B) which contain no groups reactive to anhydride and unsaturated (meth)acrylate groups in the absence of moisture and of which the blocked amino groups consist solely of hexahydropyrimidine, tetrahydroimidazole, aldimine, ketimine and/or oxazolane groups of the type mentioned are used as sole blocked polyamines. The preferred combinations according to the invention produced in this way contain 40 to 90 parts by weight of copolymers A) and 10 to 60 parts by weight of compounds B) containing hexahydropyrimidine, tetrahydroimidazole, ketimine, aldimine or oxazolane groups.

The quantitative ratios in which components A) and B) are used are generally selected in such a way that, for every blocked amino group of component B), there is a total of 0.2 to 8 and preferably 0.5 to 4 unsaturated (meth)acrylate and anhydride groups of component A). In general, a larger excess of the groups just mentioned within the ranges mentioned will be selected when the other components contain reactive groups which react with unsaturated (meth)acrylate or acid anhydride groups in the absence of moisture. Groups such as these include in particular primary or secondary amino groups which may be present in component B), for example in addition to the blocked amino groups, and also alcoholic hydroxyl groups which may be present in component C) or even in component B) in addition to the blocked amino groups. In general, however, alcoholic hydroxyl groups are substantially inert to unsaturated (meth)acrylate and acid anhydride groups under the conditions of the process according to the invention (room temperature), so that the hydroxyl groups only have to be considered when they are used in the form of substantially involatile alcohols which do not evaporate during the use of the combinations according to the invention and may be considered as reactant for component A), for example at relatively high temperatures of the type prevailing during the hardening of coatings.

Complex mixtures containing amide groups (through reaction of the acid anhydride groups with amino groups) or amino groups (through reaction of unsaturated (meth)acrylate groups with amino groups) are formed where the binders according to the invention are produced by mixing of the individual components, particularly when compounds containing free primary or secondary amino groups in addition to the blocked amino groups are used as component B). Accordingly, the expression "binders" in the context of the invention encompasses not only pure mixtures of the individual components A) and B) and, optionally, the other components, in which no reaction products of the individual components are present, but also systems in which reaction products of this type are present in addition to the individual components or which essentially consist solely of such reaction products. In all variants of the production of the binders according to the invention by mixing of the individual components, the type of individual components and the quantitative ratios between them are preferably selected in such a way that the molar ratio of acid anhydride and unsaturated (meth)acrylate groups to blocked amino groups on completion of the reaction, which may take place spontaneously, between acid anhydride or unsaturated (meth)acrylate groups on the one hand and primary or secondary amino groups on the other hand is from 0.2:1 to 8:1 and more especially from 0.5:1 to 4:1, in which case an excess of acid anhydride or unsaturated (meth)acrylate groups should again be considered where the individual components used contain alcoholic hydroxyl groups which may be considered in addition to the blocked amino groups as reactant for the acid anhydride or unsaturated (meth)acrylate groups in the use according to the invention.

In addition, in the context of the invention, "blocked polyamines B) containing hydrogen atoms reactive to acid anhydride or unsaturated (meth)acrylate groups"

are understood to be not only blocked polyamines of the type mentioned which contain reactive hydrogen atoms in chemically bound form, but also those which are present in admixture with excess polyamine or hydroxylamine used for their production.

So far as the suitability of the binder combinations according to the invention is concerned, it is largely immaterial whether the possibly spontaneous reaction between the copolymers A) and the groups reactive to acid anhydride or unsaturated (meth)acrylate groups has already come completely to an end. If desired, however, it is also possible to terminate this reaction before the use according to the invention by brief heating to 40° to 100° C. For the rest, the binders according to the invention are preferably produced at room temperature.

The binders according to the invention are generally liquid at room temperature (often because of the presence of solvents), show adequate stability in storage in the absence of water and, after application to a substrate, generally harden rapidly in the presence of atmospheric moisture.

In general, crosslinked films are obtained even at room temperature. The basically very rapid hardening process may be further accelerated by drying at higher temperatures. Drying times of 10 to 30 minutes at temperatures of 80° to 130° C. are advantageous Where blocked amino groups particularly stable to hydrolysis are used or where involatile polyhydric alcohols C) are co-used, this forced drying at elevated temperatures may be necessary to obtain the optimal property spectrum.

The coating compositions and sealing compounds containing the binders according to the invention may contain the auxiliaries and additives normally used in lacquers, including for example pigments, fillers, levelling aids, antioxidants or UV absorbers.

These auxiliaries and additives should be largely anhydrous and are preferably incorporated in the starting components, generally in component A), before the production of the binders.

The lacquers and coating compositions containing the products according to the invention as binders generally have a pot life of 1 to 24 hours. However, the pot life may be corrected upwards or downwards as required through the choice of suitable reactants. The coating compositions (lacquers) and sealing compounds may be applied to any, optionally pretreated, substrates, including for example metals, wood, glass, ceramics, stone, concrete, plastics, textiles, leather, cardboard or paper, by spray coating, spread coating, dip coating, flood coating, casting, roll coating, trowelling.

In the following Examples, all parts and percentages are by weight, unless otherwise stated.

EXAMPLES

General procedure for the production of the copolymers $A'_1$ to $A'_4$ containing anhydride groups Part I is initially introduced into a 4-liter reaction vessel equipped with a stirrer, cooling and heating system and heated to the reaction temperature. Part II and Part III are then added at the same time over a total period of 2.5 hours and 3 hours, respectively. The mixture is then stirred for 2 hours at the reaction temperature.

The reaction temperatures and the compositions of parts I to III are shown in Table 1 together with the characteristic data of the copolymers obtained.

TABLE 1

| (Quantities in g) | | | | |
|---|---|---|---|---|
| | Copolymers | | | |
| | $A'_1$ | $A'_2$ | $A'_3$ | $A'_4$ |
| Part I | | | | |
| Butyl acetate | 1020 | 1020 | 1020 | 1020 |
| Part II | | | | |
| n-butylacrylate | 732 | 476 | 549 | 604 |
| Methyl methacrylate | 476 | 732 | 549 | 604 |
| Styrene | 274 | 274 | 384 | 274 |
| Maleic anhydride | 275 | 275 | 275 | 275 |
| Part III | | | | |
| Tert.-butyl peroctoate (70%) | 105 | 105 | 105 | 105 |
| Butylacetate | 118 | 118 | 118 | 118 |
| Reaction temperature (°C.) | 120 | 120 | 120 | 120 |
| Solids content (%) | 59.9 | 59.7 | 59.8 | 60.7 |
| Viscosity (mPa · s, 23° C.) | 2318 | 12630 | 6652 | 8173 |

II) General procedure for reaction of the anhydride-functional copolymers $A'_1$ to $A'_4$ with hydroxyl or aminofunctional unsaturated (meth)acrylates to form components $A_1$ to $A_{13}$ The reaction components shown in Table 2 are introduced into a 1-liter reaction vessel equipped with a stirrer, cooling and heating system and heated to the reaction temperature, followed by stirring for 4 hours at that temperature.

TABLE 2

| Components | $A_1$ | $A_2$ | $A_3$ | $A_4$ | $A_5$ | $A_6$ | $A_7$ | $A_8$ | $A_9$ | $A_{10}$ | $A_{11}$ | $A_{12}$ | $A_{13}$ |
|---|---|---|---|---|---|---|---|---|---|---|---|---|---|
| Copolymers | 600$A'_1$ | 600$A'_2$ | 600$A'_3$ | 600$A'_1$ | 600$A'_2$ | 600$A'_3$ | 600$A'_4$ | 600$A'_2$ | 600$A'_3$ | 600$A'_3$ | 600$A'_3$ | 600$A'_2$ | 600$A'_1$ |
| 2-Hydroxyetheyl acrylate | 32 | 32 | 32 | | | | | | | | | | |
| 4-Hydroxybutyl acrylate | | | | 32 | | | | | | | 65 | | |
| Hydroxyethyl methacrylate | | | | | 22 | | | | | 44 | | | |
| 2-Hydroxypropyl methacrylate | | | | | | 16 | | | | | | | |
| Glycerol dimethacrylate | | | | | | | | 25 | | | | | |
| Diacrylate of 4 x-ethoxylated trimethylolpropane | | | | | | | 70 | | | | | | |
| Diacrylate of 3 x-propoxylated trimethylolpropane | | | | | | | | | | 58 | | 116 | |
| 2-Tert.-butylaminoethyl methacrylate | | | | | | | | | | | | | 31 |
| Hydroquinone monomethyl ether | 0.6 | 0.6 | 0.6 | 0.6 | 0.4 | 0.3 | 0.6 | 0.6 | 0.4 | 0.7 | 1.0 | 0.8 | 0.3 |

TABLE 2-continued

| Components | (Quantities in g) | | | | | | | | | | | | |
|---|---|---|---|---|---|---|---|---|---|---|---|---|---|
| | $A_1$ | $A_2$ | $A_3$ | $A_4$ | $A_5$ | $A_6$ | $A_7$ | $A_8$ | $A_9$ | $A_{10}$ | $A_{11}$ | $A_{12}$ | $A_{13}$ |
| Butyl acetate | 20 | 20 | 20 | 20 | 15 | 10 | 75 | 110 | 38 | 30 | 45 | 77 | 80 |
| Reaction temperature (°C.) | 125 | 125 | 125 | 125 | 125 | 125 | 125 | 125 | 125 | 125 | 125 | 125 | 100 |
| Percentage of anhydride groups reacted (%) | 50 | 50 | 50 | 40 | 30 | 20 | 20 | 30 | 25 | 60 | 80 | 50 | 50 |
| Solids content (%) | 59.8 | 59.6 | 50.2 | 59.2 | 59.5 | 59.6 | 55.3 | 55.5 | 59.5 | 59.8 | 59.3 | 60.2 | 55.6 |
| Viscosity (mPa · s, 23° C.) | 2837 | 8778 | 5630 | 2456 | 9031 | 5934 | 41205 | 1595 | 3055 | 6937 | 10920 | 5390 | 12005 |

III) Preparation of components B) capable of crosslinking $B_1$ 513 g cyclohexane and 456 g isobutyraldehyde are introduced under nitrogen into a 2-liter reaction vessel equipped with a stirrer, cooling and heating system. 529.8 g 1-amino-3-methylaminopropane are added dropwise at 10° C. (ice bath cooling), after which the mixture is stirred for hour at 10° C. and then heated at the reflux temperature until no more water is eliminated. Cyclohexane and excess isobutyraldehyde are then distilled off and the hexahydropyrimidine crosslinker $B_1$ is obtained.

$B_2$

In a 3-liter reaction vessel equipped with a stirrer, cooling and heating system, 680 g isophoronediamine, 1000 g methyl isobutyl ketone and 560 g toluene are refluxed under nitrogen on a water separator until the theoretical quantity of water has been eliminated (144 g) or until no more water is eliminated. Toluene and excess methyl isobutyl ketone are then distilled off and the bisketimine crosslinker $B_2$ is obtained.

$B_3$ a) 1050 g diethanolamine and 615 g cyclohexane are introduced under nitrogen into a 4 liter reaction vessel equipped with a stirrer, cooling and heating system. 1408 g 2-ethyl hexanal are then added dropwise at room temperature, the temperature slowly rising. The mixture is then kept at the reflux temperature until the separation of water is complete. Cyclohexane and excess 2-ethyl hexanal are then distilled off. An oxazolane, the intermediate stage $B_{3a}$), is obtained.

b) Preparation of $B_3$ 200.6 g of an isocyanurate polyisocyanate based on hexamethylene diisocyanate, consisting essentially of N,N',N''-tris-(6-isocyanatohexyl)-isocyanurate, and 207 g butyl acetate are introduced under nitrogen into a reaction vessel equipped with a stirrer, cooling and heating system and heated to 60° C. After the dropwise addition of 286.7 g of the oxazolane intermediate stage $B_{3a}$), the mixture is kept at 70° C. for 10 hours. A 70% solution of the crosslinker $B_3$, containing 3 oxazolane groups on a statistical average, is obtained.

IV) Preparation of the binder combinations according to the invention

The components A) containing anhydride and unsaturated (meth)acrylate groups and the polyamine components B) are mixed together at room temperature and adjusted to a processible viscosity, optionally by addition of more auxiliaries C).

The films are coated onto metal test plates using a film drawing tool (wet film thickness 180 μm). The films applied and stored at room temperature were all tack-free after 60 minutes at the longest. After ageing, i.e. 24 hours at room temperature, clear, crosslinked, solvent-resistant films characterized by excellent mechanical properties and very good optical properties are obtained.

The paint mixtures prepared all had a pot life of several hours.

The compositions of the binder combinations and the solvent resistances (degree of crosslinking) are shown in Table 3 below.

Solvent resistance is tested by a wiping test using a cotton wool plug impregnated with methyl isobutyl ketone (MIBK). The number of double wipes for which the film remains visibly unchanged is shown. No film was subjected to more than 200 double wipes.

TABLE 3

| | Application Example | | | | | |
|---|---|---|---|---|---|---|
| | 1 | 2 | 3 | 4 | 5 | 6 |
| Component A) | 50 g $A_1$ | 50 g $A_2$ | 50 g $A_3$ | 50 g $A_4$ | 50 g $A_5$ | 50 g $A_6$ |
| Component B) | 24 g $B_3$ | 24 g $B_3$ | 24 g $B_3$ | 24 g $B_3$ | 24 g $B_3$ | 25 g $B_3$ |
| Butyl acetate | 40 g | 40 g | 40 g | 40 g | 40 g | 40 g |
| Pot life | >4 h | >4 h | >4 h | >4 h | >4 h | >4 h |
| MIBK wiping test after 24 h at room temperature, number of double wipes | >200 | >200 | >200 | >200 | >200 | >200 |
| Molar ratio of (anhydride and unsaturated (meth)acrylate groups) to NH (after hydrolytic release) | 1:1 | 1:1 | 1:1 | 1:1 | 1:1 | 1:1 |

| | Application Example | | | | | |
|---|---|---|---|---|---|---|
| | 7 | 8 | 9 | 10 | 11 | 12 |
| Component A) | 50 g $A_7$ | 50 g $A_8$ | 50 g $A_9$ | 50 g $A_{10}$ | 50 g $A_{11}$ | 50 g $A_{12}$ |
| Component B) | 26 g $B_3$ | 25.5 g $B_3$ | 29 g $B_3$ | 24 g $B_3$ | 23 g $B_3$ | 21 g $B_3$ |
| Butyl acetate | 40 g | 40 g | 40 g | 40 g | 40 g | 40 g |
| Pot life | >3 h | >3 h | >3 h | >4 h | >4 h | >3 h |
| MIBK wiping test after 24 h at room temperature, number of double wipes | >200 | >200 | >200 | >200 | >200 | >200 |

TABLE 3-continued

| | | | | | | |
|---|---|---|---|---|---|---|
| Molar ratio of (anhydride and unsaturated (meth)acrylate groups) to NH (after hydrolytic release) | 1:1 | 1:1 | 1:1 | 1:1 | 1:1 | 1:1 |

| | Application Example | | | | | |
|---|---|---|---|---|---|---|
| | 13 | 14 | 15 | 16 | 17 | 18 |
| Component A) | 50 g $A_1$ | 50 g $A_3$ | 50 g $A_4$ | 50 g $A_6$ | 50 g $A_7$ | 50 g $A_{11}$ |
| Component B) | 7.4 g $B_2$ | 7.4 g $B_2$ | 7.4 g $B_2$ | 7.6 g $B_2$ | 8.0 g $B_2$ | 7.0 g $B_2$ |
| Butyl acetate | 30 g | 30 g | 30 g | 30 g | 30 g | 30 g |
| Pot life | >4 h | >4 h | >4 h | >4 h | >3 h | >4 h |
| MIBK wiping test after 24 h at room temperature, number of double wipes | >200 | >200 | >200 | >200 | >200 | >200 |
| Molar ratio of (anhydride and unsaturated (meth)acrylate groups) to NH (after hydrolytic release) | 1:1 | 1:1 | 1:1 | 1:1 | 1:1 | 1:1 |

| | Application Example | | | |
|---|---|---|---|---|
| | 19 | 20 | 21 | 22 |
| Component A) | 50 g $A_3$ | 50 g $A_6$ | 50 g $A_{10}$ | 50 g $A_{13}$ |
| Component B) | 3.2 g $B_1$ | 3.2 g $B_1$ | 3.2 g $B_1$ | 2.9 g $B_1$ |
| Butyl acetate | 25 g | 25 g | 25 g | 25 g |
| Pot life | >4 h | >4 h | >4 h | >4 h |
| MIBK wiping test after 24 h at room temperature, number of double wipes | >200 | >200 | >200 | >200 |
| Molar ratio of (anhydride and unsaturated (meth)acrylate groups) to NH (after hydrolytic release) | 1:1 | 1:1 | 1:1 | 1:1 |

What is claimed is:

1. A binder for moisture-hardening coating compositions or sealing compounds which consists essentially of
    A) 30 to 99 parts by weight of a copolymer component consisting essentially of at least one modified copolymer having a weight average molecular weight of from 1,500 to 75,000 determined by gel permeation chromatography of olefinically unsaturated compounds containing chemically incorporated moieties which are addition-reactive to amino wherein the modified copolymers contain both
        (i) intramolecular carboxylic anhydride moieties derived from maleic anhydride or itaconic anhydride and
        (ii) olefinically unsaturated (meth)acrylate moieties in chemically bound form as the moieties which are addition-reactive to amino, with the anhydride equivalent weight being in the range from 392 to 9,800 and the (meth)acrylate equivalent weight in the range from 284 to 7,100 and
    B) 1 to 70 parts by weight of a polyamine component consisting of at least one organic polyamine containing blocked amino groups and, with or without
    C) auxiliaries and additives, wherein the ratios between components A) and B) are selected such that, for every blocked amino of component B), there are a total of 0.2 to 8 anhydride and (meth)acrylate groups of component A).

2. A binder as claimed in claim 1 wherein component B) consists essentially of compounds containing at least one aldimine, ketimine, oxazolane, hexahydropyrimidine or tetrahydroimidazole moiety.

3. In an improved moisture-hardening coating or sealing composition containing a moisture-hardening binder, the improvement comprises said binder being a binder as claimed in claim 2.

4. In an improved moisture-hardening coating or sealing composition containing a moisture-hardening binder, the improvement comprises said binder being a binder as claimed in claim 1.

* * * * *